Jan. 20, 1970          R. F. SCRUTON           3,490,333
                         TOOL RETAINER
                       Filed March 3, 1966
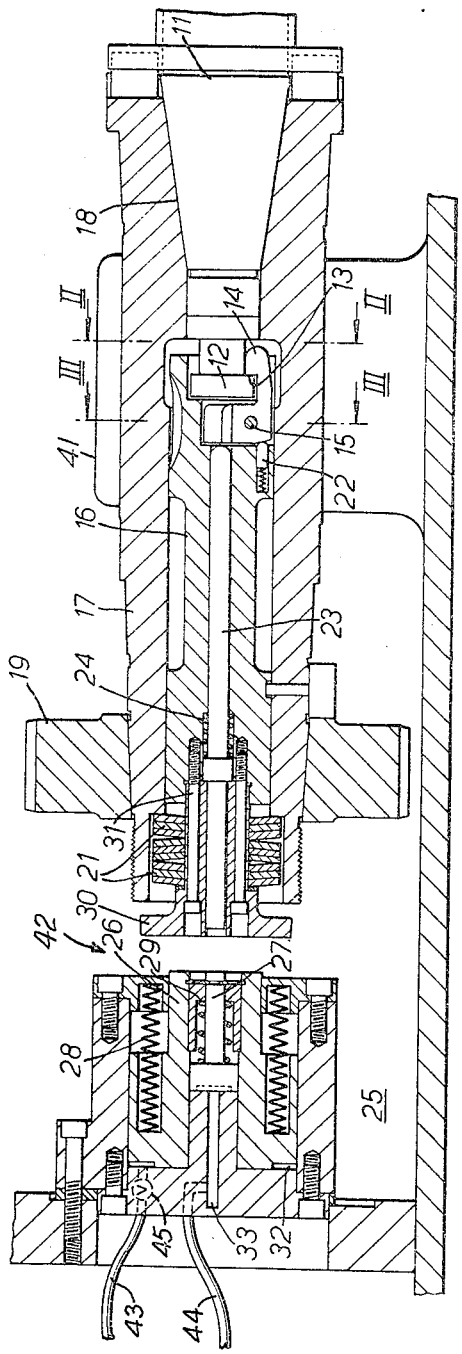
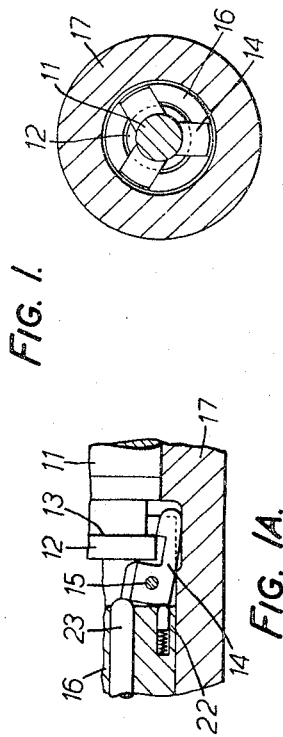
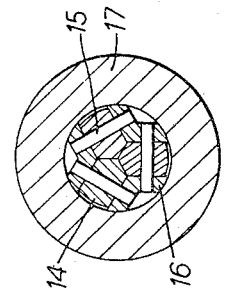
INVENTOR
ROYSTON F. SCRUTON
BY
Holcombe, Wetherill + Brisebois
ATTORNEYS United States Patent Office 3,490,333
Patented Jan. 20, 1970

3,490,333
TOOL RETAINER
Royston Frederick Scruton, Altrincham, England, assignor to George Richards & Company Limited, Altrincham, England, a British company
Filed Mar. 3, 1966, Ser. No. 531,594
Claims priority, application Great Britain, Mar. 4, 1965, 9,324/65
Int. Cl. B23c 1/00, 3/00, 7/00
U.S. Cl. 90—11         4 Claims

ABSTRACT OF THE DISCLOSURE

A tool retainer for a drill or the like comprising a body formed with a socket in which a tool can be wedged, a releasable clutch which positively engages the tool, spring means between the clutch and body to urge the tool into wedging engagement with the socket, and power actuator for releasing the clutch and the tool.

---

This invention relates to a tool retainer, for example, for retaining a drill or other tool in position in a machine tool whether for being driven or being held stationary against a driven work piece.

According to the present invention a tool retainer includes a body formed with a socket in which a tool (or tool holder) of corresponding shape can be wedged, a releasable clutch for positive engagement with the tool and means acting between the clutch and body arranged to urge the tool in the clutch into wedging engagement with the socket.

The invention enables the tool to be wedged and released mechanically without requiring a tedious manual operation.

Conveniently, springs are arranged to urge the tool in the clutch into wedging engagement with the socket and in one form of the invention they comprise a stack of disc springs.

A hydraulic or other power actuator may be provided for releasing the wedging engagement possibly by effecting movement of the clutch in relation to the body against the springs. There may also be hydraulic or other power actuated means for releasing the clutch so that the tool can be removed after the wedging engagement has been broken.

In one form of the invention the clutch comprises an arrangement of spring-loaded pawls for engagement with the tool and there may be an elongated member carrying the pawls and a release rod for the pawls extending within the elongated member.

Conveniently, a hydraulic actuator assembly is positioned at the inner end of the tool retainer and is controlled by valve means for admitting hydraulic fluid to one or two pistons.

The body may be formed with one or more external gears or the equivalent for driving the tool.

The invention may be carried into practice in various ways and one embodiment will now be described by way of example as applied to a mechanism for positively retaining a tool or tool holder in position in a machine tool.

Reference will be made to the accompanying drawings in which:

FIGURE 1 is a section through the tool retainer,

FIGURE 1A is a detail of FIGURE 1 but showing the clutch in the release position, FIGURE 2 is a section on the line II—II in FIGURE 1, and FIGURE 3 is a section on the line III—III in FIGURE 1.

The end of the tool or tool holder 11 is formed with an external annular flange 12 defining a shoulder 13 on its under face for engagement by three pawls 14 which are pivotally mounted at 15 at the end of an elongated pawl carrier 16 extending in a bore in the generally cylindrical body 17 of the retaining mechanism. The body can rotate in a bearing 41 and is formed at its outer end with a conical socket 18 into which a corresponding conical surface at the end of the tool holder 11 can be forced in the conventional way. The pawls 14 and pawl carrier 16 constitute a releasable clutch for the tool holder.

The retainer body has one or more external spur gear wheels 19 for providing the drive to the tool.

The pawl carrier 16 is urged inwardly along the axis of the retainer body 17 by a number of strong disc springs 21 surrounding the inner end of the pawl carrier and acting to urge the pawl carrier with the tool holder 11 engaged by the pawls 14 in the direction to pull the conical end of the tool holder firmly into wedging engagement in the conical socket 18.

The pawls 14 are arranged circumferentially around the outer end of the pawl carrier 16 so that each can pivot about an axis 15 in a plane perpendicular to the axis of the pawl holder into and out of engagement with the shoulder 13 on the tool holder.

The pawls are urged towards the engaged position by spring-loaded studs 22 mounted in the end of the pawl carrier 16, but they can be released by a longitudinally movable thrust rod 23 which can move outwards in relation to the pawl carrier and act on the inner ends of the three pawls 14 to cause them all to turn about their axes 15 and to move radially out of engagement with the shoulder 13 on the tool holder. The thrust rod 23 is urged by a spring 24 away from the position in which it releases the pawls.

Engagement and release of the tool holder is effected by a hydraulic actuator assembly 25 mounted just to the rear and spaced from the retainer body 17 by a gap 42.

This assembly consists of two axially movable hydraulic pistons 26 and 27 each urged by a spring 28 or 29 away from the retainer body and each capable of moving axially in the direction of the tool holder when acted upon by hydraulic fluid pressure.

The two pistons act, one 26 on a flange 30 secured by bolts 31 at the rear end of the pawl carrier and engaging the disc springs 21 and the other 27 on the inner end of the thrust rod 23 in the pawl carrier. The first, larger, piston 26 surrounds the other piston 27.

When it is desired to release the tool holder, hydraulic fluid is admitted at 32 through a line 43 and a valve 45 to the larger piston 26 so that it moves against the flange 30 at the rear end of the pawl carrier and moves this the short distance against the retainer body 17 which is necessary to compress the disc springs 21 and just force the conical shank 18 of the tool holder away from its conical socket. Thereafter fluid is admitted at 33 through a line 44 to the smaller piston 27, which moves the thrust rod 23 axially to release the pawls 14 from the shoulder of the tool holder so that the tool holder can easily be withdrawn.

For re-engaging the tool holder it is first necessary to push the holder 11 into its socket and then to release hydraulic fluid from the smaller piston 27 so that the spring 24 urges the thrust rod back and allows the pawls 14 to re-engage the tool shoulder 13. Then when fluid is released from the larger piston 26 the disc springs 21 can move the complete pawl holder assembly back in the retainer body with the tool holder to wedge the tool holder firmly in the conical socket.

What I claim as my invention and desire to secure by Letters Patent is:

1. A tool retaining and releasing assembly including a body formed with a socket in which a tool of corresponding shape can be wedged, a releasable clutch carried by said body for positive engagement with the tool, a first power actuator for releasing the clutch, spring means comprising a stack of disc springs acting between the clutch and body for holding the clutch against movement permitting removal of the tool from wedging engagement with the socket, and a second power actuator structurally related to the assembly for effecting movement of the clutch in relation to the body and thereby releasing a tool when in wedging engagement in the socket.

2. A tool retaining and releasing assembly including a body formed with a socket in which a tool of corresponding shape can be wedged, a releasable clutch carried by said body and comprising spring-loaded pawls for positive engagement with the tool, a first power actuator for releasing the clutch, spring means acting between the clutch and body for holding the clutch against movement permitting removal of the tool from wedging engagement with the socket, and a second power actuator structurally related to the assembly for releasing a tool when in wedging engagement in the socket.

3. An assembly as claimed in claim 2 including an elongated member carrying the pawls, and a release rod for the pawls extending along and within the elongated member.

4. An assembly as claimed in claim 1 including a power actuator assembly positioned spaced from the inner end of the tool retainer and including a hydraulically operated piston for acting on part of the tool retainer, and valve means for controlling the admission of hydraulic fluid to the piston.

References Cited

UNITED STATES PATENTS

| | | |
|---|---|---|
| 1,022,761 | 4/1912 | Stvanek. |
| 2,713,811 | 7/1955 | Stephan _____ 90—11 |
| 2,860,547 | 11/1958 | Stephan _____ 90—11 |
| 3,254,567 | 6/1966 | Daugherty _____ 90—11 |
| 3,168,322 | 2/1965 | Dziedzic. |
| 3,288,032 | 11/1966 | Pankonin et al. _____ 29—11 X |
| 3,316,629 | 5/1967 | Meyer _____ 29—11 X |

ROBERT C. RIORDON, Primary Examiner

U.S. Cl. X.R.

279—4